(12) United States Patent
Rafart Mouthon et al.

(10) Patent No.: US 12,157,153 B2
(45) Date of Patent: Dec. 3, 2024

(54) METHOD FOR THE MANUFACTURE OF INSOLUBLE LEAD ANODES, USED IN ELECTROWINNING OR ELECTRO-REFINING PROCESSES OF HIGH PURITY METALS

(71) Applicant: ÁNODOS DE CHILE S.A., Lampa (CL)

(72) Inventors: Horacio Rafart Mouthon, Quinta normal (CL); Antonio Carracedo Rosende, Calama (CL)

(73) Assignee: ÁNODOS DE CHILE S.A., Lampa (CL)

( * ) Notice: Subject to any disclaimer, the term of this patent is extended or adjusted under 35 U.S.C. 154(b) by 906 days.

(21) Appl. No.: 17/193,198

(22) Filed: Mar. 5, 2021

(65) Prior Publication Data
US 2021/0276061 A1  Sep. 9, 2021

(30) Foreign Application Priority Data
Mar. 6, 2020 (CL) .................................... 0575-2020

(51) Int. Cl.
*B23K 1/00* (2006.01)
*B21B 1/22* (2006.01)
*B21B 1/28* (2006.01)
*B23K 1/08* (2006.01)
(Continued)

(52) U.S. Cl.
CPC .................. *B21B 1/28* (2013.01); *B21B 1/22* (2013.01); *B23K 1/08* (2013.01); *C25C 1/00* (2013.01); *C25C 7/02* (2013.01)

(58) Field of Classification Search
CPC .... B21B 1/28; B21B 1/22; B23K 1/08; C25C 1/00; C25C 7/02
See application file for complete search history.

(56) References Cited

U.S. PATENT DOCUMENTS 2,119,936 A * 6/1938 White ..................... C25C 1/12
205/342
3,855,089 A * 12/1974 McCutchen .............. C25C 1/00
205/594
(Continued)

FOREIGN PATENT DOCUMENTS

CA        3111306 A1 *  9/2021  ............... C25C 7/02
CN    108301022 A  *  7/2018  ............... C25C 1/10
(Continued)

*Primary Examiner* — Kiley S Stoner
(74) *Attorney, Agent, or Firm* — Merchant & Gould P.C.

(57) ABSTRACT

A method for the manufacture of insoluble lead anodes, with low segregation of the constituent elements of the anodic alloy for the electrowinning of metals, free of buckling, used in electrolytic processes, which comprises: Obtaining a continuous plate (4) of lead or lead alloy 10 to 30 mm thick by 900 to 1,100 mm wide by means of a continuous casting process; Cut the continuous plate (4) according to a determined length obtaining a pre-plate (6) that will give the length of one or more plates of the anode (8); Roll the lead or lead alloy pre-plate (6) using a cold rolling mill (7) to a thickness of 6 to 12 mm, keeping the cold rolling temperature of the pre-plate under 60° C., obtaining the anode plate(s) (8); Remove the anode plate (8) from the rolling mill (7); Weld (12) a copper bar (10) to the upper end of the anode plate (11).

3 Claims, 3 Drawing Sheets

(51) Int. Cl.
*C25C 1/00* (2006.01)
*C25C 7/02* (2006.01)

(56) References Cited

U.S. PATENT DOCUMENTS

| | | | | |
|---|---|---|---|---|
| 4,619,751 | A | * | 10/1986 | Robinson .................. C25C 7/04 204/267 |
| 2011/0272114 | A1 | * | 11/2011 | Mouthon .................. C25C 7/02 164/75 |
| 2012/0006679 | A1 | * | 1/2012 | Ellis ..................... B23K 20/127 204/280 |
| 2018/0142368 | A1 | * | 5/2018 | Vidaurre-Heiremans ................... C25C 1/12 |
| 2020/0346293 | A1 | * | 11/2020 | Rafart Mouthon ..... C22C 11/08 |

FOREIGN PATENT DOCUMENTS

| | | | | | |
|---|---|---|---|---|---|
| CN | 109355684 | A | * | 2/2019 | |
| CN | 110144607 | B | * | 6/2020 | ............... C25C 7/02 |
| CN | 113913870 | A | * | 1/2022 | |
| CN | 109690829 | B | * | 2/2022 | ............. B23K 26/38 |
| GB | 2596819 | A | * | 1/2022 | ............. B23K 10/02 |

\* cited by examiner

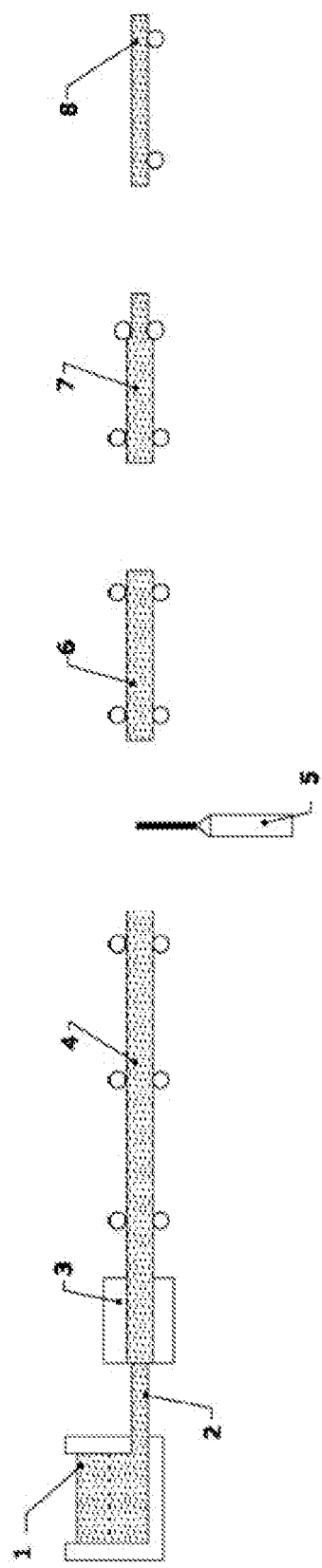

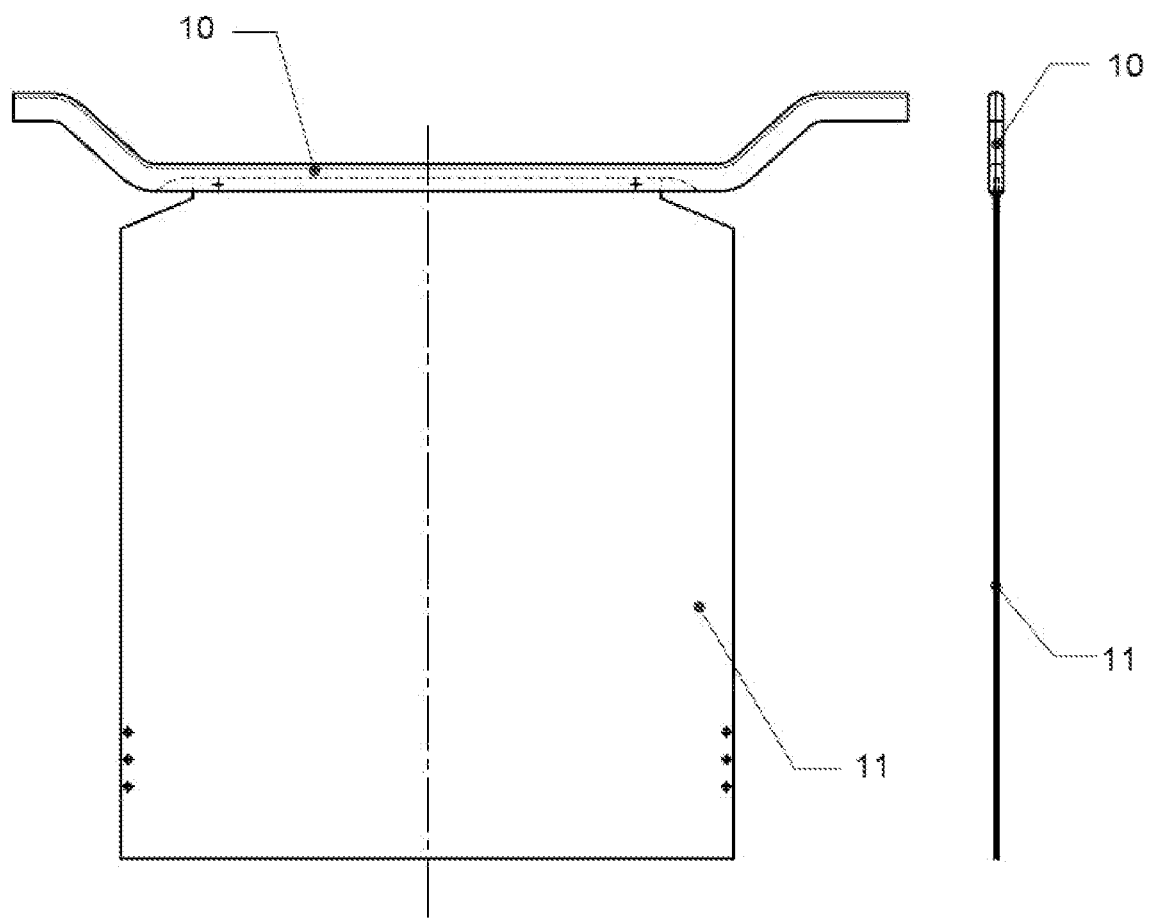
Figure # 2

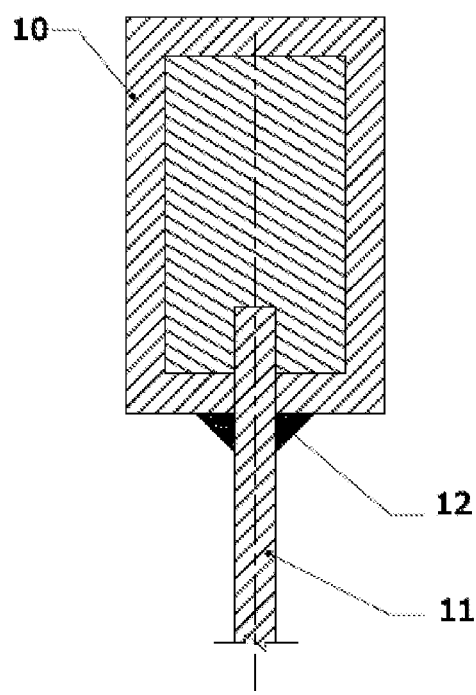
Figure # 3

METHOD FOR THE MANUFACTURE OF INSOLUBLE LEAD ANODES, USED IN ELECTROWINNING OR ELECTRO-REFINING PROCESSES OF HIGH PURITY METALS

This application claims benefit of Serial No. 0575-2020, filed 6 Mar. 2020 in Chile and which application is incorporated herein by reference. To the extent appropriate, a claim of priority is made to the above disclosed application.

FIELD OF THE INVENTION

This invention is related with a method for the manufacturing process of lead insoluble anodes, used in electro winning/electro-refining processes for high-purity metals. It also deals with an anode which eliminates plates hot lamination, which allows to make improvements against other current known manufacturing methods.

BACKGROUND OF THE INVENTION

It is known that using electro winning & electro-refining process for metals comes from 1860s. From that time on this technology has been continuously developing to date, when solvent extraction technology was created, the lead insoluble anodes had a significant change. These anodes are made up of a lead plate of about 1×1 meter, and 6 to 12 mm thick. They also have a current conducting copper bar on the top as the positive electrode for electrolysis purposes. Namely, the high purity of the electrolytes obtained by means of solvent extraction does not stand contamination of the cathodes thus lead obtained, as it happened in the old fashion way. This determinant disturbed all the knowledge about lead insoluble anodes, as at that time they were usually melted with lead-antimony based alloys, thus becoming what we know today as new-generation anodes. These are mainly lead-calcium-tin alloy laminated plates. This new alloy combination, with laminated plates instead of melted plates has allowed to manufacture highly pure cathodes, but with some problems involved.

As it is easy to understand, the introduction of lamination for obtaining anodes base plates introduced in the market technologies associated with lamination itself, and also methods for attaching the plate with the copper busbar, that in the old system did not involve any problem. Currently there are a plurality of assembly systems that have prevailed for the attachment of between the busbar-body and the anode, and in the lamination technology per se.

SUMMARY OF THE INVENTION

This invention deals with a method for manufacturing lead plates with a thickness between 10 to 30 mm and a width of about 900 to 1,100 mm by using continuous casting with further cold lamination, replacing melting of the 100-200 mm thick billet and its hot lamination as well, thus avoiding segregation of the components thereof, thus significantly reducing costs and simplifying its manufacturing process.

BRIEF DESCRIPTION OF THE FIGURES

In order to better understand this invention, a selected embodiment shall be described. This does not mean the protection is related thereto, but, all those variations deriving from the exposition of this invention and from the claims are an integral part of the protection. The example for this invention shall be used as a base for the exposition of this invention, as described in the drawings, where:

FIG. 1 describes a Schematic Diagram of the method for manufacturing lead plates.

FIG. 2 describes a lead anode and its components.

FIG. 3 describes welding of the copper bar onto the lead plate.

DESCRIPTION OF THE INVENTION

The method of this Invention proposes a manufacturing process technology aimed to technically solve the negative aspects of hot lamination systems, by proposing a structural anode providing excellent conductivity, excellent corrosion rate, combing free, the copper bar/lead plate joint does not come off, no segregation, cheaper and operationally simpler to be manufactured, obtaining such features by making significant modifications in the lead plate manufacturing process.

These significant modifications mainly have to do with replacing hot lamination by continuous casting system, for the manufacturing process of the anode lead plates.

This method eliminates pre-plates hot lamination. In the State of the Art this is between 100 to 200 mm thick. It is replaced by a continuous casting pre-plate (6). Just as described in FIG. 1, in the proposed method the continuous casting is gravity driven. This consist of initially feeding a reservoir (1) with liquid melted lead, at a temperature between 350 to 450° C. Through the tube (2) the reservoir (1) feeds a cooled mold (3) where a continuous plate (4) is formed. This plate comes off the mold by using constant traction on the the cold edge. At this stage it is also possible to obtain the thickness and the width of the continuous plate (4). The continuous plate (4) is transferred by using rollers positioned on top and below and it is cut with a saw (5) into pre-plates (6) thus getting a final thickness between 10 to 30 mm and a width between 900 to 1.100 mm. After this, the pre-plates (6) obtained are transferred to a cold lamination station (7) in order to provide final thickness of the pre-plate (6), between 6 to 12 mm. This process makes the plate (8) to have highly effective mechanical properties against those resulting from combining hot/cold lamination, as it minimizes segregation, specially on the eutectic alloys, such as lead-silver alloys used for zinc electro-winning anodes.

Namely, when the initial 100-200-mm thick billets are manufactured for hot lamination, the cooling process is very slow, as the billet is very thick, and the alloy is segregated, i.e. the composition of the alloy components vary in certain percentages, thus getting richer in one of the components and less in the others on the central shallow surface area and towards the center of the billet thickness, which is the last area to be solidified. This percentage variation-differenced at the core of the alloy-causes different wear out levels on the anode surface, which may cause severe damages in the operation thereof.

This system aimed to obtain 10-30 mm pre-plates (6) for cold lamination, by using continuous casting significantly reduces segregation as the thickness is much lower and the cooling speed of the continuous plate (4) during continuous casting is much higher than cooling and very even, thus guaranteeing a very low segregation, and also significantly decreasing the huge energy costs involved in hot laminating a 100-200 mm billet. The following cold lamination process, whether if it is conventional hot lamination or for a pre-plate (6) obtained from continuous casting herein described must be executed in such a way that, none of the cold lamination stages exceeds a temperature higher than 60° C. (140° F.), so that the grain size is correct, thus improving corrosion resistance.

Finally, the plate (8) obtained from continuous casting pre-plate (6) lamination is cut, according to the length of the anode and a copper bar (10) is attached by welding (12), the upper corner of the anode (11) plate, thus allowing its installation at the electro winning cells.

Using this system allows to obtain anodes with the aforementioned features, providing better conductivity, longer duration, less combing, better handling at production stages, lower costs, and a very small segregation of the components making up the anodes alloy.

The invention claimed is:

1. A method for manufacturing lead insoluble anodes, of the type used in electrolytic processes of electro winning of metals and which avoids the segregation of the components of an anode plate, the method comprising:

obtaining a continuous plate made of lead/lead alloy by using continuous casting;

cutting the continuous plate according to a pre-determined length to obtain a pre-plate;

rolling the pre-plate by using a cold rolling mill to a thickness of 6 to 12 mm, and maintaining a cold rolling temperature of the pre-plate under 60° C. (140° F.) to obtain an anode plate;

removing the anode plate from the cold rolling mill; and welding a copper bar on an upper end of the anode plate.

2. The method according to claim 1, wherein the continuous casting is conducted at a temperature between 350° C. to 450° C. (662° F.-842° F.).

3. The method according to claim 1, wherein the continuous plate dimensions are 10 to 30 mm thick and 900 to 1,100 mm wide.

* * * * *